(12) United States Patent
Serna

(10) Patent No.: US 7,458,596 B1
(45) Date of Patent: Dec. 2, 2008

(54) BICYCLE PEG ASSEMBLY

(75) Inventor: James Serna, 20239 N. 30th St., Phoenix, AZ (US) 85050

(73) Assignees: James Serna, Phoenix, AZ (US); Teresa Latas-Serna, Phoenix, AZ (US)

( * ) Notice: Subject to any disclaimer, the term of this patent is extended or adjusted under 35 U.S.C. 154(b) by 162 days.

(21) Appl. No.: 11/173,575

(22) Filed: Jun. 30, 2005

(51) Int. Cl.
*B62J 25/00* (2006.01)
(52) U.S. Cl. .................................... 280/291; 280/288.4
(58) Field of Classification Search ............. 208/288.4, 208/291, 293, 304, 304.3; 74/564
See application file for complete search history.

(56) References Cited

U.S. PATENT DOCUMENTS

| | | | |
|---|---|---|---|
| 5,524,918 A | * | 6/1996 | Peabody et al. ............. 280/291 |
| 5,884,983 A | | 3/1999 | Wu |
| 6,070,897 A | * | 6/2000 | Hsieh et al. .................. 280/291 |
| 6,199,887 B1 | | 3/2001 | Lee |
| 6,247,761 B1 | | 6/2001 | Lin |
| 6,485,044 B1 | | 11/2002 | Blake |
| 6,663,129 B1 | | 12/2003 | Smith |
| 7,182,360 B2 | * | 2/2007 | Paasch et al. ............... 280/291 |
| 2007/0085299 A1 | * | 4/2007 | Hanlon ..................... 280/288.4 |

* cited by examiner

*Primary Examiner*—Tony H. Winner

(57) ABSTRACT

A bicycle peg assembly is designed for attachment to a threaded extension on a bicycle. The peg assembly includes an inner member with first and second ends, where the first end is internally threaded to matingly engage a threaded extension on a bicycle. The second end of the inner member is engagable for attaching and removing the inner cylindrical member from the threaded extension on a bicycle. An outer hollow cylindrical member is rotatably supported on the inner member for rotation about the inner member.

26 Claims, 5 Drawing Sheets

BICYCLE PEG ASSEMBLY

BACKGROUND

This invention relates to bicycle accessories and in particular, to bicycle peg assemblies.

DETAILED DESCRIPTION

Figure 1:
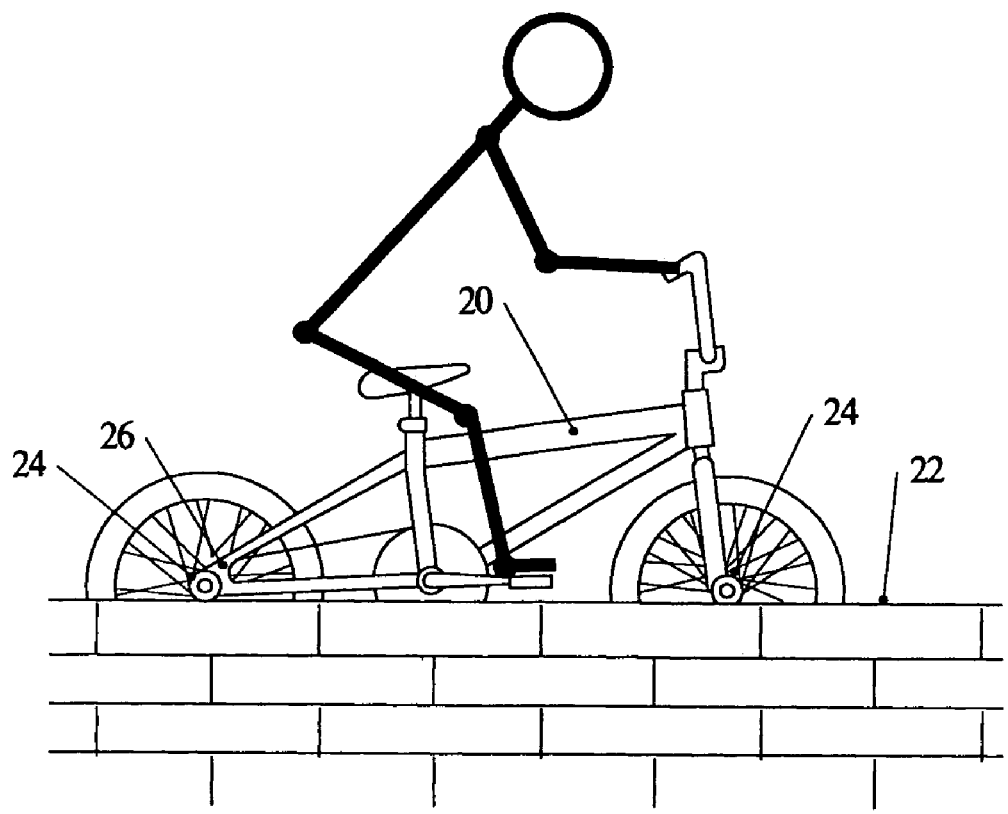
FIG. 1 is a diagrammatic view of a person on a bicycle using an embodiment of the invention.

Reference now should be made to the drawings, in which the same reference numbers are used throughout the different figures to designate the same components. FIG. 1 illustrates the manner of use of an embodiment of the invention. FIG. 1 depicts a person riding a bicycle 20 to which bicycle peg assemblies 24 are attached to extensions of the front and rear axles of the bicycle. The peg assemblies 24 extend sufficiently laterally outwardly from the bicycle to allow the assemblies 24 to roll over the top of a fence or rail 22. The top of the fence or rail 22 may be flat; or it may be designed with a circular cross section. The peg assemblies 24 are designed to be used in conjunction with the sport of "grinding" on a bicycle.

Figure 2:
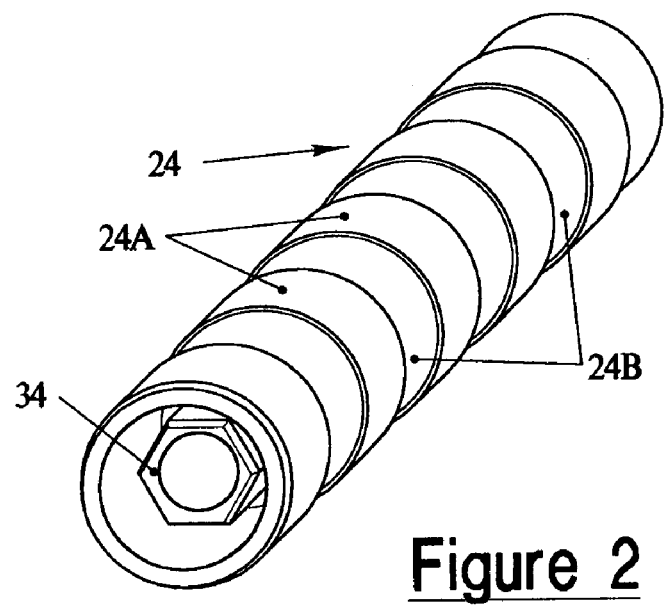
FIG. 2 is a top left perspective view of an embodiment of the invention.

FIG. 2 is a top left perspective view of an embodiment of the invention. This figure shows the outer cylindrical configuration of the peg assembly 24, the outer surface of which is designed to have alternating circumferential raised portions 24A separated by recessed or lower circumferential portions 24B. This configuration of high and low portions 24A and 24B is to be considered as illustrative, however; and the entire outer surface may be of the same diameter, or substantially the same diameter, from end to end of the assembly 24.

Figure 3:
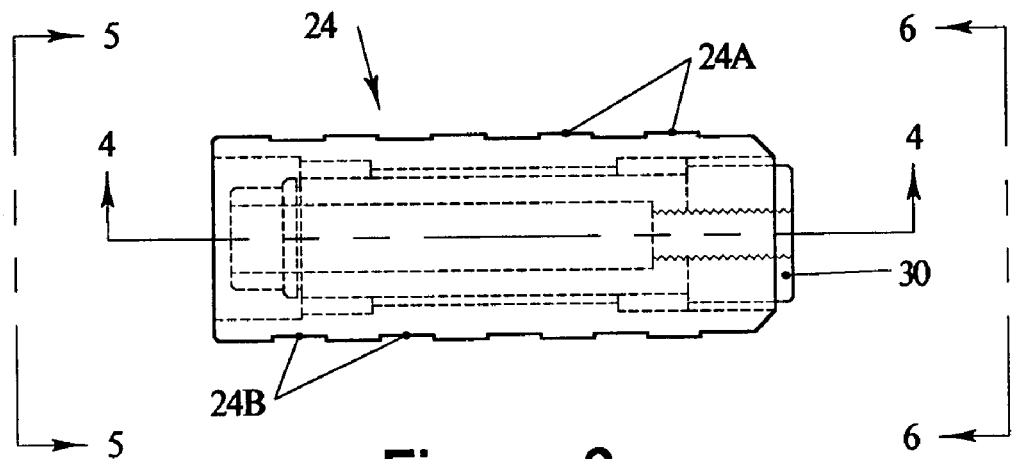
FIG. 3 is a top view of the embodiment shown in FIG. 2.

FIG. 3 is a top view of the embodiment shown in FIG. 2 to illustrate the relative dimensions of the member 24. Typically, the length of the outer portion of the assembly 24 is approximately 4.125", with an approximate 1.5" overall diameter for the portions 24A. These dimensions, however, can be varied in order to suit the particular operating characteristics desired by the rider of the bicycle 20 to which these bicycle peg assemblies 24 are attached.

Figure 4:
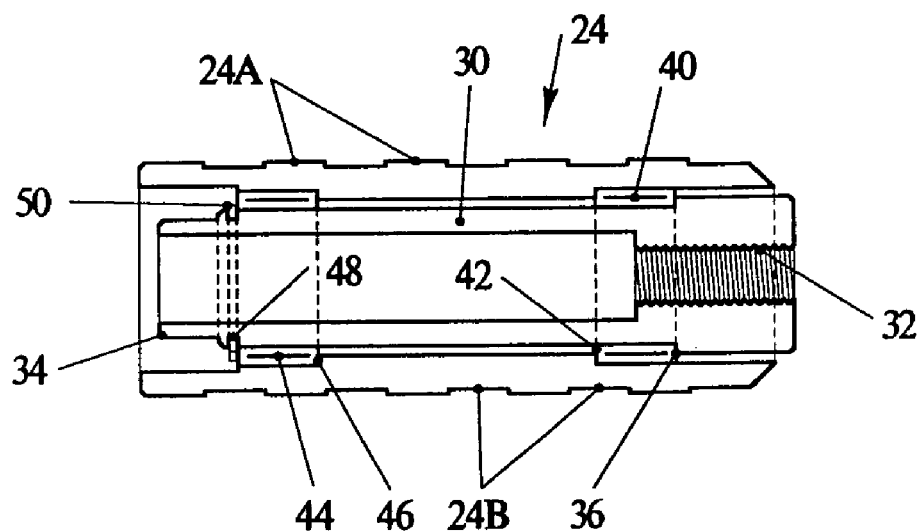
FIG. 4 is a cross-sectional view taken along the line 4-4 of FIG. 3.
Figures 5, 6:
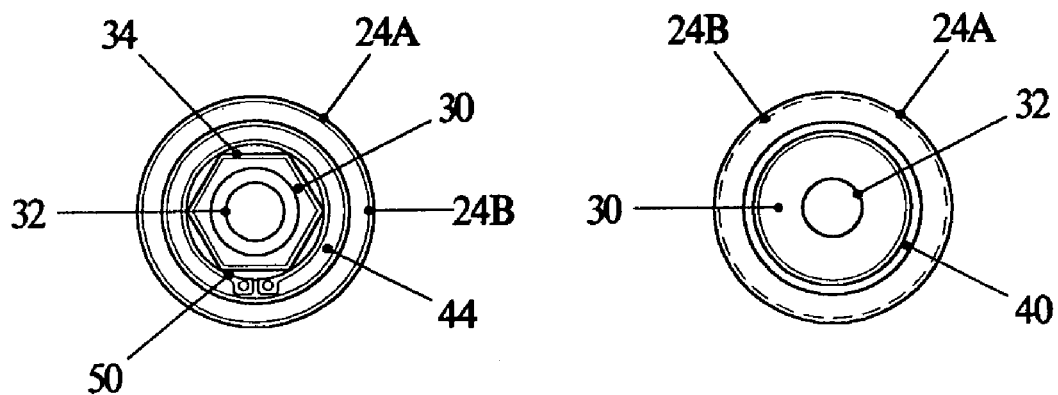
FIG. 5 is an end view taken along the line 5-5 of FIG. 3.
FIG. 6 is an end view taken along the line 6-6 of FIG. 3.

Reference now should be made to FIGS. 4,5,6,7 and 8 which illustrate the details of the embodiment generally illustrated in FIGS. 2 and 3. FIG. 4 is a cross-sectional view taken along the line 4-4 of FIG. 3, and shows the outer cylindrical portion of the assembly 24 carried on a pair of spaced-apart bearings 40 and 44, supported by an inner cylindrical member 30. The inner member 30 has a relatively thicker right-hand end (as viewed in FIG. 4) with an internally threaded hole 32 passing through it. The hole 32 is designed to fit onto the threaded outer extension of a typical bicycle axle (front or rear) to allow attachment of the peg assembly to the threaded wheel axle (or other threaded part) of a bicycle. The other end (the left-hand end as shown in FIG. 4) of the inner cylindrical member 30 is designed in the configuration of a standard hex nut 34, with opposing flats for engagement by a tool, such as a socket wrench, or by the fingers of a person desiring to install the assembly onto a threaded wheel axle extension or other threaded extension on a bicycle. Both ends of the outer cylindrical portion of the assembly 24 are open; so that access to the nut-like end 34 of the inner cylinder 30 is easily accomplished through the open left-hand end (as viewed in FIGS. 2,4,8 and 9) of the outer cylindrical portion of the assembly 24.

Figure 7:
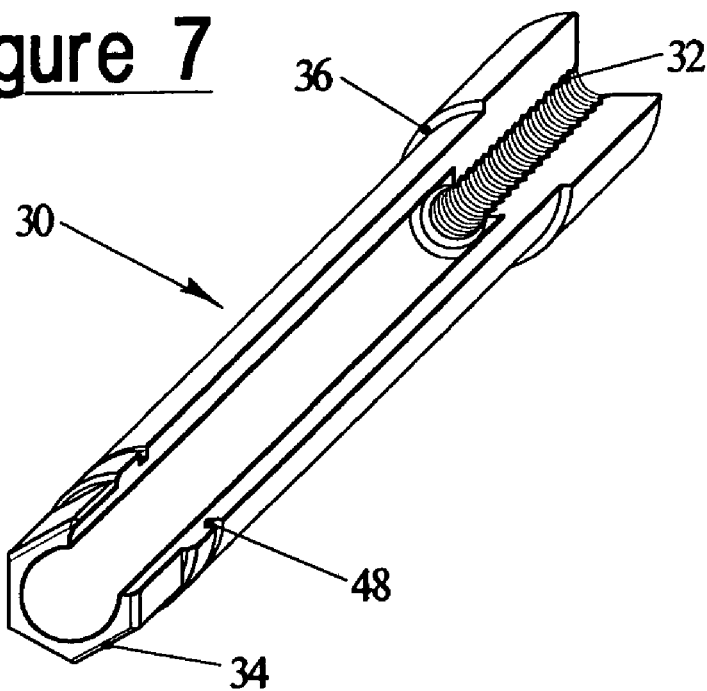
FIG. 7 is a partially cut away perspective view of a portion of the embodiment shown in FIGS. 2 through 6.

In constructing the bicycle peg assembly, the outer race of a bearing 40 first is slid over the inner cylinder 30 from the left-hand end to the right (as shown in FIG. 4) to abut a shoulder 36, shown most clearly in FIGS. 4 and 7. After the bearing 40 is in place on the inner cylinder 30, the outer cylinder 24A/24B is slid over the inner cylinder 30 from left to right (as viewed in FIGS. 4,7 and 8) to cause a shoulder 42 to abut the other side of the outer race of the bearing 40. This causes the parts to be aligned in the position shown most clearly in FIG. 4.

Figure 8:
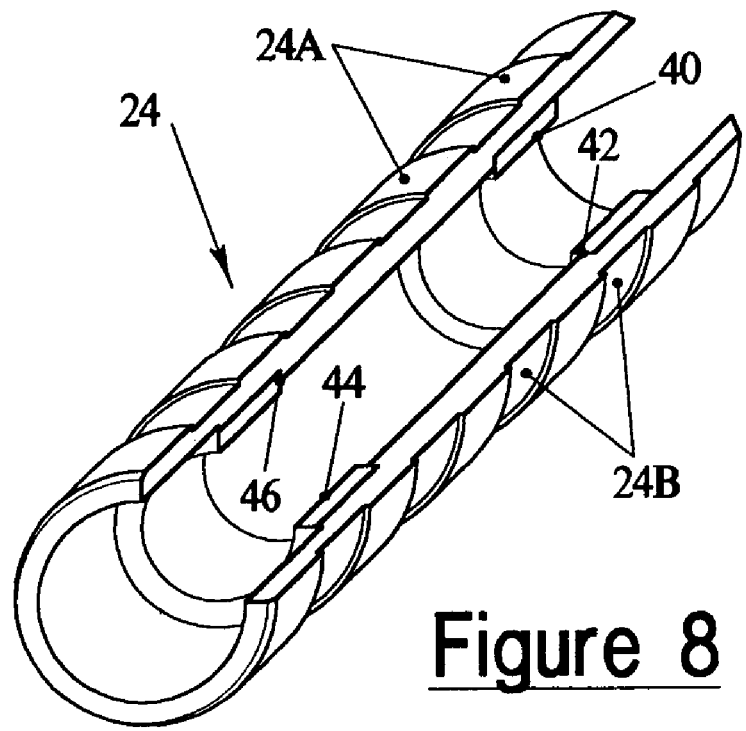
FIG. 8 is a partially cut away cross-sectional perspective view of a portion of the embodiment shown in FIGS. 2 through 6.

Next, a bearing 44 is slid from left to right (as viewed in FIGS. 4 and 7) over the inner cylinder 30 to abut a shoulder 46 (on the interior of the outer cylinder 24A/24B, as shown most clearly in FIGS. 4 and 8). After the bearing 44 is in place, a snap ring 50 is placed in a groove 48 on the inner cylinder 30 to hold the entire assembly together.

Once the assembly has been completed as shown in FIG. 4, the outer races of the bearings 40 and 44 are held in place against axial movement; and the outer cylinder 24A/24B also is restrained against any axial movement with respect to the inner cylinder 30. It should be noted that the inner and outer cylinders are concentrically located to rotate about a common axis, which typically also is the central axis of the bicycle axle extension to which the assembly is attached.

Figure 9:
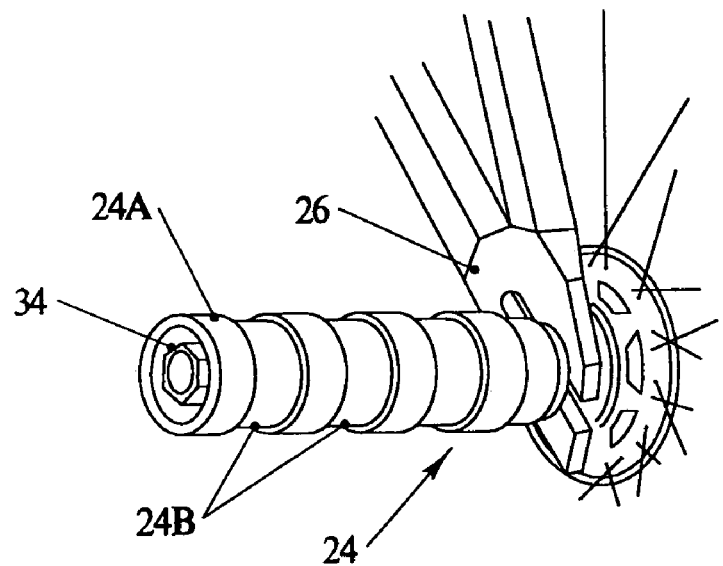
FIG. 9 is a perspective view showing the manner of attachment of the embodiment of FIGS. 2 through 8 on a bicycle; and, FIG. 10 is a cross-sectional view of the embodiment of the invention shown in FIGS. 2 through 8 showing the manner of attachment to a bicycle.
Figure 10:
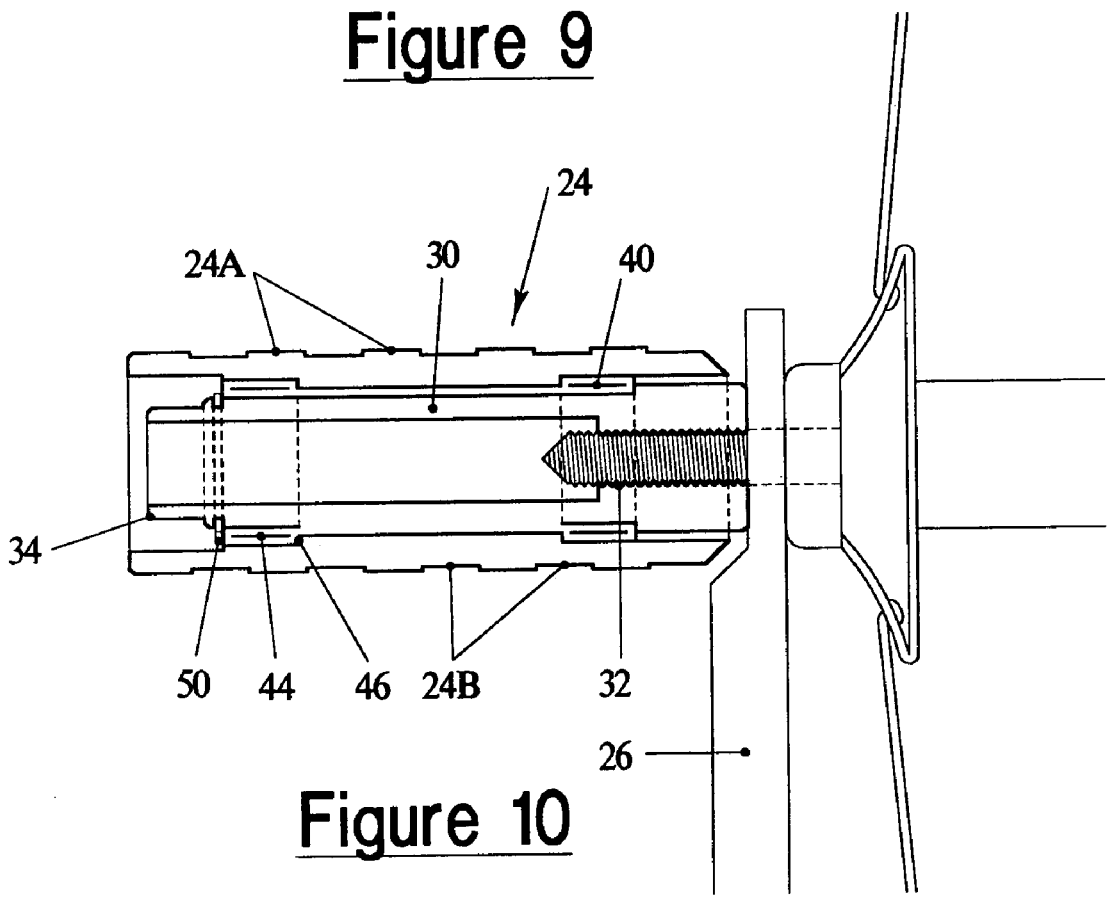

Reference now should be made to FIGS. 9 and 10 which illustrate the manner in which the bicycle peg assembly of FIGS. 2 through 8 is attached to the threaded extension 60 of a typical bicycle axle. To attach the peg assembly to the axle, the retaining nut which normally is placed over the extension 60 is removed. The inner threaded portion 32 of the inner cylinder 30 then is rotated until the right-hand end (as viewed in FIGS. 4,9 and 10) of the assembly firmly abuts the frame extension 26 of the bicycle. The right-hand end of the inner cylinder 30 then firmly engages the frame extension 36 in the same manner as the conventional nut which the assembly replaces.

Tightening of the assembly (and subsequent loosening to remove the assembly) is accomplished by means of rotation of the end 34 of the inner cylinder 30 by use of a suitable tool, such as a socket wrench or the like. Because the overlying end of the outer cylinder 24A/24B is fully open, access to the flats on the end 34 of the inner cylinder 30 readily is accomplished.

As is most evident in FIG. 10, but also apparent in FIGS. 3 and 4, the outer cylinder 24A/24B is set a slight space inwardly (to the left as viewed in these figures) from the end of the inner cylinder 30; so that the outer cylinder is free to rotate about the inner cylinder 30 without scraping on or interfering with the portion 26 of the bicycle. Also, as shown in FIGS. 3,4 and 10, the outer cylinder 24A/24B extends slightly beyond the end of the inner cylinder 30 at the portion 34; so that when the bicycle is rolled over a surface, such as the surface 22 of FIG. 1, the outer cylinder 24 prevents contact of the surface 22 with any portion of the inner cylinder 30 or the end 34.

It is apparent from the foregoing that the outer cylinder 24A/24B rotates freely on the bearings 40 and 44, with the inner cylinder 30 serving to securely mount the entire assembly onto the threaded extension 60 of the bicycle. Because the inner cylinder 30 is attached and removed by engagement of the end 34, it is possible to cause the rotating portion (the outer cylinder) to be located very close to the frame 26 of the bicycle, since it is not necessary to allow access for a wrench or other tool between the frame 26 and the right-hand end (FIGS. 3,4,7,8,9 and 10) of any portion of the peg assembly.

The bearings 40 and 44 may be any suitable type, such as slip bearings, roller bearings, ball bearings or the like. While two separate bearings have been shown, the inner cylinder 30 may be designed to support the outer cylinder 24 by means of a single bearing or bearing surface, or by means of more than two bearings.

The foregoing description of the embodiments of the invention is to be considered as illustrative and not as limiting. Various changes will occur to those skilled in the art for performing substantially the same function, in substantially the same way, to achieve substantially the same result without departing from the true scope of the invention as defined in the appended claims.

What is claimed is:

1. A bicycle peg assembly for attachment to a threaded wheel axle extension on a bicycle, including in combination: an inner cylindrical member having first and second ends with the first end thereof having an internally threaded portion for matingly engaging the threaded wheel axle extension on the bicycle, and with the second end thereof located for engagement by a tool to facilitate attaching and removing the inner cylindrical member from the threaded wheel axle extension of a bicycle; and an outer hollow cylindrical member, having first and second open ends, and overlying at least a portion of the inner cylindrical member; and at least one support member supporting the outer cylindrical member for rotation about the inner cylindrical member.

2. A bicycle peg assembly according to claim 1 wherein the support member is a bearing support member.

3. A bicycle peg assembly according to claim 2 wherein the support member includes two axially spaced apart bearings located near the first and second ends of the inner cylindrical member, respectively.

4. A bicycle peg assembly according to claim 3 wherein the inner and outer cylindrical members are coaxially mounted with respect to one another.

5. A bicycle peg assembly according to claim 4 wherein the support member supports the outer hollow cylindrical member for rotation about the inner cylindrical member and further constrains the outer cylindrical member against axial movement relative to the inner cylindrical member.

6. A bicycle peg assembly according to claim 5 wherein the outer hollow cylindrical member overlies substantially the entire length of the inner cylindrical member.

7. A bicycle peg assembly according to claim 6 wherein the second end of the inner cylinder has opposing flats thereon.

8. A bicycle peg assembly according to claim 1 wherein the support member supports the outer hollow cylindrical member for rotation about the inner cylindrical member and further constrains the outer cylindrical member against axial movement relative to the inner cylindrical member.

9. A bicycle peg assembly according to claim 8 wherein the inner and outer cylindrical members are coaxially mounted with respect to one another.

10. A bicycle peg assembly according to claim 9 wherein the outer hollow cylindrical member overlies substantially the entire length of the inner cylindrical member.

11. A bicycle peg assembly according to claim 1 wherein the second end of the inner cylinder has opposing flats thereon.

12. A bicycle peg assembly according to claim 1 wherein the support member includes two axially spaced apart bearings located near the first and second ends of the inner cylindrical member, respectively.

13. A bicycle peg assembly for attachment to a threaded extension on a bicycle including in combination: an inner cylindrical member having first and second ends with the first end thereof having an internally threaded portion for matingly engaging the threaded extension on the bicycle, and with the second end thereof engagable for securing and removing the inner cylindrical member from the threaded extension on a bicycle; an outer hollow cylindrical member with first and second open ends and having an internal diameter greater than the external diameter of the inner cylindrical member; wherein the first end of the inner cylindrical member extends beyond the first end of the outer cylindrical member, and wherein the second end of the outer cylindrical member is open to allow access to the second end of the inner cylindrical member and means located between the exterior of the inner cylindrical member and the interior of the outer hollow cylindrical member for rotatably supporting the outer cylindrical member on the inner cylindrical member.

14. A bicycle peg assembly according to claim 13 wherein the means for supporting the outer cylindrical member for rotation about the inner cylindrical member comprises at least one bearing.

15. A bicycle peg assembly according to claim 14 wherein the at least one bearing includes at least first and second spaced-apart bearings located, respectively, near the first and second ends of the inner cylindrical member.

16. A bicycle peg assembly according to claim 15 wherein the second end of the outer cylindrical member extends axially beyond the second end of the inner cylindrical member.

17. A bicycle peg assembly according to claim 16 wherein the second end of the inner cylindrical member has at least first and second opposing flats thereon.

18. A bicycle peg assembly according to claim 13 wherein the second end of the inner cylindrical member has at least first and second opposing flats thereon.

19. A bicycle peg assembly for attachment to a threaded extension on a bicycle including in combination: an inner member having first and second ends, with the first end thereof having an internally threaded portion for matingly engaging the threaded extension on a bicycle, and with the second end located for engagement to attach and remove the inner member from the threaded extension on the bicycle; an outer hollow cylindrical member having first and second open ends; at least one support member for supporting the outer cylindrical member on the inner member for rotation about the inner member.

20. A bicycle peg assembly according to claim 19 wherein the support member is a bearing support member.

21. A bicycle peg assembly according to claim 20 wherein the support member supports the outer hollow cylindrical member for rotation about the inner member and further constrains the outer cylindrical member against axial movement relative to the inner member.

22. A bicycle peg assembly according to claim 21 wherein the outer hollow cylindrical member overlies substantially the entire length of the inner member.

23. A bicycle peg assembly according to claim 22 wherein the support member includes two axially spaced apart bearings located near the first and second ends of the inner member, respectively.

24. A bicycle peg assembly according to claim 23 wherein the second end of the inner member has opposing flats thereon.

25. A bicycle peg assembly according to claim 19 wherein the support member supports the outer hollow cylindrical member for rotation about the inner member and further constrains the outer cylindrical member against axial movement relative to the inner member.

26. A bicycle peg assembly according to claim 19 wherein the second end of the inner member has opposing flats thereon.

* * * * *